United States Patent
Kodera et al.

(10) Patent No.: US 11,661,103 B2
(45) Date of Patent: May 30, 2023

(54) STEERING CONTROL DEVICE AND METHOD FOR CONTROLLING STEERING SYSTEM

(71) Applicants: JTEKT CORPORATION, Osaka (JP); TOYOTA JIDOSHA KABUSHIKI KAISHA, Toyota (JP)

(72) Inventors: Takashi Kodera, Okazaki (JP); Isao Namikawa, Okazaki (JP); Yusuke Kakimoto, Okazaki (JP); Yoshio Kudo, Machida (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 504 days.

(21) Appl. No.: 16/801,867

(22) Filed: Feb. 26, 2020

(65) Prior Publication Data
US 2020/0283059 A1   Sep. 10, 2020

(30) Foreign Application Priority Data
Mar. 5, 2019   (JP) .............................. JP2019-039765

(51) Int. Cl.
*B62D 5/04* (2006.01)
*B62D 5/00* (2006.01)

(52) U.S. Cl.
CPC ......... *B62D 5/0463* (2013.01); *B62D 5/0424* (2013.01); *B62D 5/006* (2013.01)

(58) Field of Classification Search
CPC ..... B62D 5/0463; B62D 5/0424; B62D 5/006
See application file for complete search history.

(56) References Cited

U.S. PATENT DOCUMENTS 7,966,114 B2 * 6/2011 Yamazaki ............ B62D 15/025
                                                       180/443
8,897,965 B2 * 11/2014 Tamaizumi .......... B62D 5/0463
                                                       701/41

(Continued)

FOREIGN PATENT DOCUMENTS

EP   2492168 A1   8/2012
EP   3216675 A1   9/2017

(Continued)

OTHER PUBLICATIONS

Jul. 31, 2020 Search Report issued in European Patent Application No. 20159828.1.

(Continued)

*Primary Examiner* — Kevin Hurley
*Assistant Examiner* — Michael R Stabley
(74) *Attorney, Agent, or Firm* — Oliff PLC

(57) ABSTRACT

A steering control device for a steering system includes an electronic control unit configured to: calculate target torque that is a target value of the motor torque; control operation of the motor; calculate a vehicle speed basic axial force based on a detected vehicle speed; calculate another state quantity basic axial force based on a state quantity other than the detected vehicle speed; calculate a distributed axial force by adding the vehicle speed basic axial force and the other state quantity basic axial force at individually set distribution ratios; calculate the target torque based on the distributed axial force; and reduce the distribution ratio of the vehicle speed basic axial force when the detected vehicle speed is abnormal as compared to when the detected vehicle speed is normal.

5 Claims, 4 Drawing Sheets

(56) References Cited

U.S. PATENT DOCUMENTS

| | | | |
|---|---|---|---|
| 8,977,437 B2 * | 3/2015 | Tamaizumi | B62D 5/0463 |
| | | | 280/771 |
| 9,701,337 B2 * | 7/2017 | Chai | G01M 17/06 |
| 9,914,473 B2 * | 3/2018 | Tamaizumi | B62D 5/0463 |
| 2014/0303850 A1 | 10/2014 | Chai et al. | |
| 2016/0229446 A1 | 8/2016 | Tamaizumi et al. | |
| 2017/0267276 A1 | 9/2017 | Kodera et al. | |
| 2018/0339725 A1 | 11/2018 | Kodera et al. | |
| 2019/0052218 A1 * | 2/2019 | Sakashita | H02P 29/028 |

FOREIGN PATENT DOCUMENTS

| | | |
|---|---|---|
| EP | 3406506 A1 | 11/2018 |
| JP | 2016-144974 A | 8/2016 |
| JP | 2017-094797 A | 6/2017 |
| JP | 2017-165219 A | 9/2017 |
| WO | 2013/061567 A1 | 5/2013 |

OTHER PUBLICATIONS

Dec. 6, 2022 Office Action issued in Japanese Patent Application No. 2019-039765.

* cited by examiner

STEERING CONTROL DEVICE AND METHOD FOR CONTROLLING STEERING SYSTEM

CROSS-REFERENCE TO RELATED APPLICATION

This application claims priority to Japanese Patent Application No. 2019-039765 filed on Mar. 5, 2019, incorporated herein by reference in its entirety.

BACKGROUND

1. Technical Field

The disclosure relates to a steering control device and a method for controlling a steering system.

2. Description of Related Art

A steer-by-wire steering system in which power transmission to and from a steering unit that is steered by a driver is separated from power transmission to and from a steered unit that steers steered wheels according to the steering operation by the driver is known as a type of steering system. In such a steering system, a road surface reaction force etc. applied to the steered wheels is not mechanically transmitted to a steering wheel. Accordingly, some steering control devices that control this type of steering system transmit road surface information to the driver by applying a steering reaction force generated in consideration of the road surface reaction force etc. from a steering-side actuator to the steering wheel.

For example, WO 2013/061567 discloses a steering control device that uses an axial force acting on a steered shaft to which the steered wheels are coupled. This steering control device calculates a steering reaction force based on a distributed axial force obtained by adding a plurality of kinds of axial forces at individually set distribution ratios. In International Patent Publication No. WO 2013/061567, an angle axial force based on the steering angle of the steering wheel and the vehicle speed, a current axial force based on the driving current for a steered-side motor that is a driving source for a steered-side actuator, etc. are shown as examples of the various axial forces, and the steering control device calculates the steering reaction force based on the distributed axial force of these axial forces.

SUMMARY

The relationship between the steered angle of the steered wheels and the axial force actually acting on the steered shaft is shown by the graphs of FIGS. 5A and 5B. This relationship changes according to the vehicle speed. That is, as shown in FIG. 5A, when the vehicle speed indicates that the vehicle is stopped, the gradient, which is a rate of change in axial force with respect to the steered angle, is small and the hysteresis component mainly indicating friction between the steered wheels and the road surface is large. As shown in FIG. 5B, when the vehicle speed indicates that the vehicle is traveling at medium to high speeds, the gradient of the axial force is large and the hysteresis component is small.

Accordingly, when calculating an angle axial force as in, for example, WO 2013/061567, an appropriate angular axial force cannot be calculated with only the steering angle or a value related to the steering angle, and the vehicle speed need be considered in addition to the steering angle. For example, when the detected vehicle speed is wrong such as when an abnormality occurs in a sensor for detecting the vehicle speed, the angle axial force may deviate from an actual axial force. There is also a possibility that the distributed axial force including the angle axial force may deviate from the actual axial force.

Such a phenomenon occurs not only when calculating the angle axial force but also when calculating an axial force for which the vehicle speed needs to be considered, such as a vehicle state quantity axial force indicated by a lateral force acting laterally on the vehicle. Even in a steering control device that controls an electric power steering system that applies an assist force for assisting a steering operation to a steering mechanism by an assist mechanism using a motor as its driving source as described in, for example, Japanese Unexamined Patent Application Publication No. 2016-144974 (JP 2016-144974 A), such a phenomenon also occurs in the case where a target value of the assist force is determined based on the axial force acting on the steered shaft.

The disclosure provides a steering control device and a method for controlling a steering system that reduces deviation of a distributed axial force from an actual axial force.

A first aspect of the disclosure relates to a steering control device that changes steering torque required to steer a steering wheel according to motor torque that is applied by an actuator using a motor as a driving source of the actuator. The steering control device includes an electronic control unit that is configured to: calculate target torque that is a target value of the motor torque; control operation of the motor such that the motor torque is generated according to the target torque; calculate a vehicle speed basic axial force based on a detected vehicle speed; calculate another state quantity basic axial force based on a state quantity other than the detected vehicle speed; calculate a distributed axial force by adding the vehicle speed basic axial force and the other state quantity basic axial force at individually set distribution ratios; calculate the target torque based on the distributed axial force; and reduce the distribution ratio of the vehicle speed basic axial force when the detected vehicle speed is abnormal as compared to when the detected vehicle speed is normal.

With the above configuration, when the vehicle speed is abnormal, the distribution ratio of the vehicle speed basic axial force calculated based on the vehicle speed is reduced, and the influence of the vehicle speed basic axial force on the distributed axial force, namely the contribution ratio of the vehicle speed basic axial force to the distributed axial force, is therefore reduced. This configuration thus reduces deviation of the distributed axial force from an actual axial force when the vehicle speed is abnormal.

In the above steering control device, the electronic control unit may be configured to set the distribution ratio of the vehicle speed basic axial force to zero when the detected vehicle speed is abnormal. With this configuration, when the vehicle speed is abnormal, the distribution ratio of the vehicle speed basic axial force calculated based on the vehicle speed is set to zero. The influence of the vehicle speed basic axial force on the distributed axial force is suitably reduced. This configuration thus suitably reduces deviation of the distributed axial force from the actual axial force when the vehicle speed is abnormal.

In the above steering control device, the vehicle speed basic axial force may be at least one of an angle axial force that does not include road surface information and a vehicle state quantity axial force including information that is transmittable through a change in lateral behavior of a vehicle out of the road surface information. The other state quantity basic axial force may be a road surface axial force including the road surface information.

In the steering control device, the steering system may have a structure in which power transmission to and from a steering unit is separated from power transmission to and from a steered unit that steers a steered wheel according to steering that is input to the steering unit. The motor may be a steering-side motor that applies the motor torque as a steering reaction force that is a force against the steering that is input to the steering unit. The electronic control unit may be configured to calculate, as the target torque, target reaction torque that is a target value of the steering reaction force.

A second aspect of the disclosure relates to a method for controlling a steering system that changes steering torque required to steer a steering wheel according to motor torque that is applied by an actuator using a motor as a driving source of the actuator. The method includes: calculating, by an electronic control unit, target torque that is a target value of the motor torque; controlling, by the electronic control unit, operation of the motor such that the motor torque is generated according to the target torque; calculating, by the electronic control unit, a vehicle speed basic axial force based on a detected vehicle speed; calculating, by the electronic control unit, another state quantity basic axial force based on a state quantity other than the detected vehicle speed; calculating, by the electronic control unit, a distributed axial force by adding the vehicle speed basic axial force and the other state quantity basic axial force at individually set distribution ratios; calculating, by the electronic control unit, the target torque based on the distributed axial force; and reducing, by the electronic control unit, the distribution ratio of the vehicle speed basic axial force when the detected vehicle speed is abnormal as compared to when the detected vehicle speed is normal.

The disclosure can reduce deviation of the distributed axial force from the actual axial force.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

First Embodiment

Figure 1:
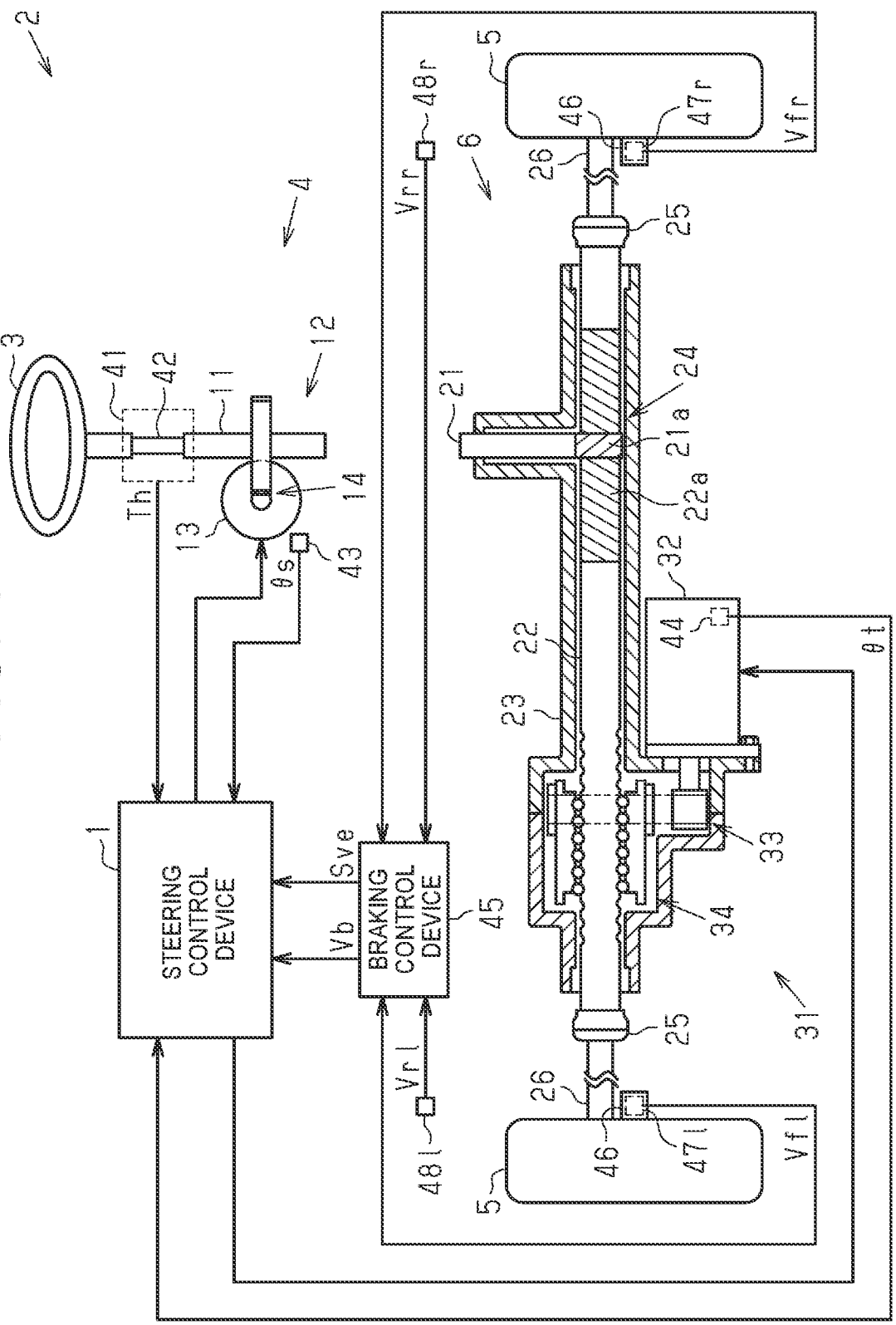
FIG. 1 is a schematic configuration diagram of a steering system of a first embodiment.

A first embodiment of a steering control device will be described with reference to the drawings. As shown in FIG. 1, a steering system 2 to be controlled by a steering control device 1 of the present embodiment is configured as a steer-by-wire steering system. The steering system 2 includes a steering unit 4 and a steered unit 6. The steering unit 4 is steered by the driver via a steering wheel 3. The steered unit 6 steers steered wheels 5 according to the steering of the steering unit 4 by the driver.

The steering unit 4 includes a steering shaft 11 and a steering-side actuator 12. The steering wheel 3 is fixed to the steering shaft 11. The steering-side actuator 12 applies a steering reaction force, which is a force against steering, to the steering wheel 3 via the steering shaft 11. The steering-side actuator 12 includes a steering-side motor 13 and a steering-side speed reducer 14. The steering-side motor 13 is a driving source, and the steering-side speed reducer 14 reduces the rotation speed of the steering-side motor 13 to transmit the reduced rotation speed to the steering shaft 11. That is, the steering-side motor 13 applies its motor torque as the steering reaction force. For example, a three-phase brushless motor is used as the steering-side motor 13 of the present embodiment.

The steered unit 6 includes a pinion shaft 21, a rack shaft 22, a rack housing 23, and a rack-and-pinion mechanism 24. The rack shaft 22 is a steered shaft coupled to the pinion shaft 21. The rack housing 23 accommodates the rack shaft 22 such that the rack shaft 22 is reciprocatable. The rack-and-pinion mechanism 24 is composed of the pinion shaft 21 and the rack shaft 22. The pinion shaft 21 and the rack shaft 22 are disposed at a predetermined crossing angle. The pinion shaft 21 has pinion teeth 21a, and the rack shaft 22 has rack teeth 22a. The rack-and-pinion mechanism 24 is configured by the pinion teeth 21a and the rack teeth 22a meshing with each other. That is, the pinion shaft 21 corresponds to a rotating shaft of which rotation is convertible into the steered angle of the steered wheels 5. Tie rods 26 are coupled to respective ends of the rack shaft 22 via rack ends 25 that are ball joints. The tip ends of the tie rods 26 are coupled to knuckles, not shown, with the right and left steered wheels 5 attached to the corresponding knuckles.

The steered unit 6 further includes a steered-side actuator 31 that applies to the rack shaft 22 a steered force that steers the steered wheels 5. The steered-side actuator 31 includes a steered-side motor 32 that is a driving source, a transmission mechanism 33, and a conversion mechanism 34. The steered-side actuator 31 transmits rotation of the steered-side motor 32 to the conversion mechanism 34 via the transmission mechanism 33 and converts the transmitted rotation to a reciprocating motion of the rack shaft 22 by the conversion mechanism 34 to apply the steered force to the steered unit 6. That is, the steered-side motor 32 applies its motor torque as the steered force. For example, a three-phase brushless motor is used as the steered-side motor 32 of the present embodiment, a belt mechanism is used as the transmission mechanism 33, and a ball screw mechanism is used as the conversion mechanism 34.

In the steering system 2 configured as described above, motor torque is applied as the steered force from the steered-side actuator 31 to the rack shaft 22 according to the steering operation by the driver, whereby the steered angle of the steered wheels 5 is changed. At this time, the steering reaction force against the steering by the driver is applied from the steering-side actuator 12 to the steering wheel 3. That is, in the steering system 2, steering torque Th necessary to steer the steering wheel 3 is changed by the steering reaction force, namely the motor torque applied from the steering-side actuator 12.

Next, the electrical configuration of the present embodiment will be described. The steering control device 1 is connected to the steering-side motor 13 and the steered-side motor 32 and controls operation of the steering-side motor 13 and the steered-side motor 32. The steering control device 1 is an electronic control unit including a central processing unit (CPU) and a memory, both not shown, and the CPU executes a program stored in the memory at predetermined calculation intervals. Various kinds of control are thus performed.

A torque sensor 41 is connected to the steering control device 1. The torque sensor 41 detects steering torque Th applied to the steering shaft 11. The torque sensor 41 is mounted at a position closer to the steering wheel 3 than the connection portion of the steering shaft 11 with the steering-side speed reducer 14. The torque sensor 41 detects the steering torque Th based on twisting of a torsion bar 42. A steering-side rotation sensor 43 and a steered-side rotation sensor 44 are also connected to the steering control device 1. The steering-side rotation sensor 43 detects a rotation angle θs of the steering-side motor 13 as a relative angle in the range of 360°. The steered-side rotation sensor 44 detects a rotation angle θt of the steered-side motor 32 as a relative angle. The detected rotation angle θs of the steering-side motor 13 is a value indicating the steering amount of the steering unit 4, and the detected rotation angle θt of the steered-side motor 32 is a value indicating the steered amount of the steered unit 6. For example, the detected steering torque Th and the detected rotation angles θs, θt take positive values in the case of steering to the right and take negative values in the case of steering to the left.

The steering control device 1 is connected to a braking control device 45 such that the steering control device 1 is communicable with the braking control device 45. The braking control device 45 is provided outside the steering control device 1. The braking control device 45 controls operation of a brake device, not shown, and calculates a vehicle speed Vb of a vehicle body. Specifically, a right front wheel sensor 47r and a left front wheel sensor 47l are connected to the braking control device 45. The right front wheel sensor 47r and the left front wheel sensor 47l are mounted on hub units 46 that support the steered wheels 5 via drive shafts, not shown, such that the steered wheels 5 are rotatable. The right front wheel sensor 47r detects a wheel speed Vfr of the steered wheel 5, namely a right front wheel. The left front wheel sensor 47l detects a wheel speed Vfl of the steered wheel 5, namely a left front wheel. A right rear wheel sensor 48r and a left rear wheel sensor 48l are also connected to the braking control device 45. The right rear wheel sensor 48r detects a wheel speed Vrr of a right rear wheel, not shown. The left rear wheel sensor 48l detects a wheel speed Vrl of a left rear wheel, not shown. The braking control device 45 of the present embodiment calculates the average of the wheel speeds Vfr, Vfl, Vrr, Vrl as the vehicle speed Vb.

The braking control device 45 also determines whether the detected vehicle speed Vb is abnormal. For example, the braking control device 45 determines that the vehicle speed Vb is abnormal when any of the wheel speeds Vfr, Vfl, Vrr, Vrl output from the right front wheel sensor 47r, the left front wheel sensor 47l, the right rear wheel sensor 48r, and the left rear wheel sensor 48l for detecting the vehicle speed Vb has an unacceptable value, when any of the wheel speeds Vfr, Vfl, Vrr, Vrl has changed from its previous value by an amount larger than a preset threshold, etc. The braking control device 45 calculates a vehicle speed state signal Sve indicating the determination result of whether the vehicle speed Vb is abnormal.

The vehicle speed Vb and the vehicle speed state signal Sve thus calculated are output to the steering control device 1. The steering control device 1 controls operation of the steering-side motor 13 and the steered-side motor 32 based on the state quantities received from the sensors and the braking control device 45.

Figure 2:
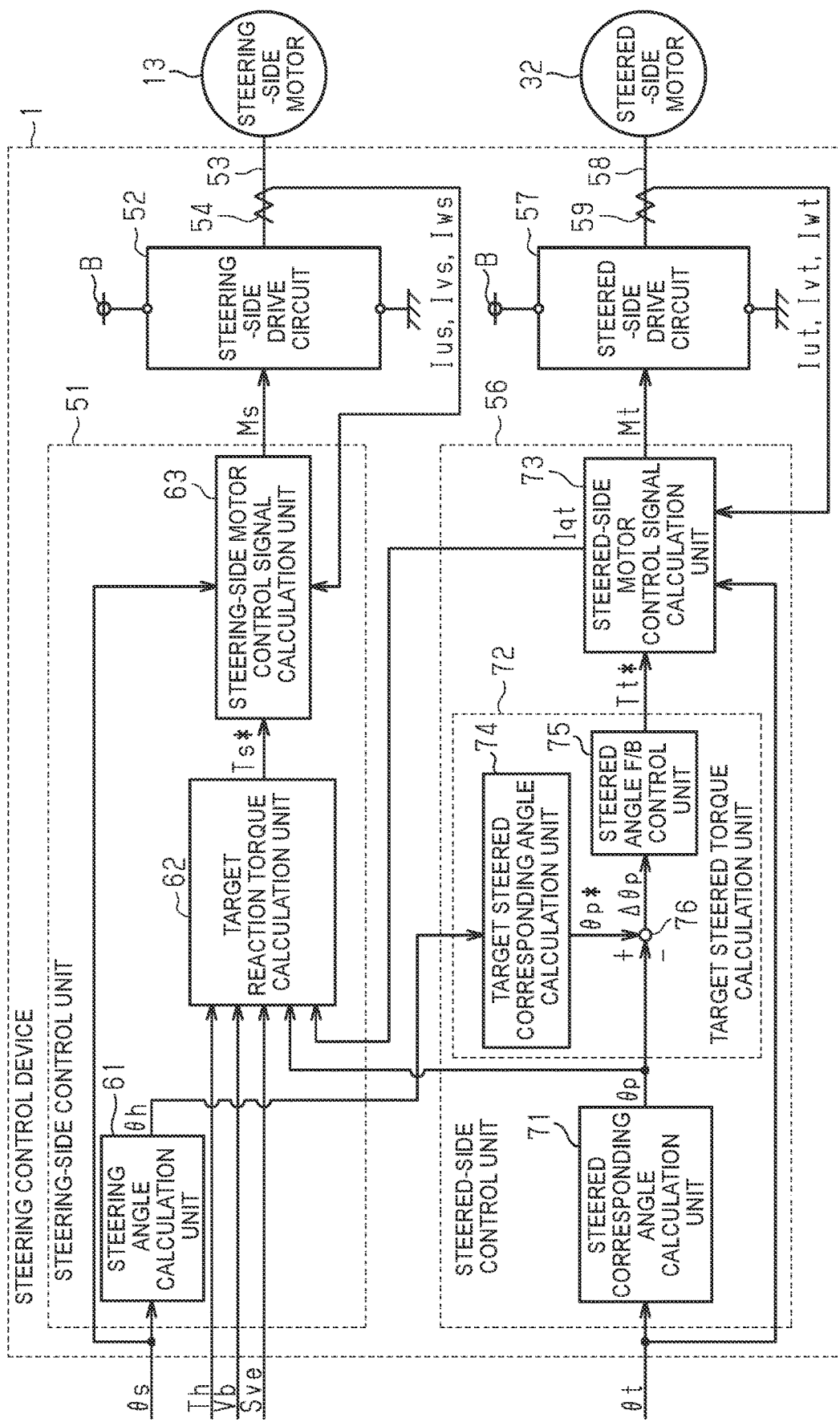
FIG. 2 is a block diagram of a steering control device of the first embodiment.

The configuration of the steering control device 1 will be described in detail. As shown in FIG. 2, the steering control device 1 includes a steering-side control unit 51 and a steering-side drive circuit 52. The steering-side control unit 51 outputs a steering-side motor control signal Ms, and the steering-side drive circuit 52 supplies driving power to the steering-side motor 13 based on the steering-side motor control signal Ms. Current sensors 54 are connected to the steering-side control unit 51. The current sensors 54 detect three-phase current values Ius, Ivs, Iws of the steering-side motor 13 flowing through connection lines 53 between the steering-side drive circuit 52 and three-phase motor coils of the steering-side motor 13. In FIG. 2, the three-phase connection lines 53 and the three-phase current sensors 54 are shown as one connection line 53 and one current sensor 54 for convenience of description.

The steering control device 1 includes a steered-side control unit 56 and a steered-side drive circuit 57. The steered-side control unit 56 outputs a steered-side motor control signal Mt, and the steered-side drive circuit 57 supplies driving power to the steered-side motor 32 based on the steered-side motor control signal Mt. Current sensors 59 are connected to the steered-side control unit 56. The current sensors 59 detect three-phase current values Iut, Ivt, Iwt of the steered-side motor 32 flowing through connection lines 58 between the steered-side drive circuit 57 and three-phase motor coils of the steered-side motor 32. In FIG. 2, the three-phase connection lines 58 and the three-phase current sensors 59 are shown as one connection line 58 and one current sensor 59 for convenience of description. Well-known pulse width modulation (PWM) inverters having a plurality of switching elements such as field effect transistors (FETs) are used for the steering-side drive circuit 52 and the steered-side drive circuit 57 of the present embodiment. The steering-side motor control signal Ms and the steered-side motor control signal Mt are gate on and off signals that define the on and off states of each switching element.

The steering-side control unit 51 and the steered-side control unit 56 output the steering-side motor control signal Ms and the steered-side motor control signal Mt to the steering-side drive circuit 52 and the steered-side drive circuit 57, respectively, whereby driving power is supplied from an on-board power source B to the steering-side motor 13 and the steered-side motor 32. The steering-side control unit 51 and the steered-side control unit 56 thus control operation of the steering-side motor 13 and the steered-side motor 32.

First, the configuration of the steering-side control unit 51 will be described. The steering-side control unit 51 generates the steering-side motor control signal Ms by performing each calculation shown in the following control blocks at predetermined calculation intervals. The steering-side control unit 51 receives the steering torque Th, the vehicle speed Vb, the vehicle speed state signal Sve, the rotation angle θs, the three-phase current values Ius, Ivs, Iws, a steered corresponding angle θp, and a q-axis current value Iqt. The steered corresponding angle θp is the rotation angle of the pinion shaft 21 described later. The q-axis current value Iqt is the drive current for the steered-side motor 32. The steering-side control unit 51 generates the steering-side motor control signal Ms based on these state quantities and output the generated steering-side motor control signal Ms.

Specifically, the steering-side control unit 51 includes a steering angle calculation unit 61, a target reaction torque calculation unit 62, and a steering-side motor control signal calculation unit 63. The steering angle calculation unit 61 calculates the steering angle θh of the steering wheel 3 based on the rotation angle θs. The target reaction torque calculation unit 62 is a target torque calculation unit that calculates target reaction torque Ts*. The target reaction torque Ts* is target torque that is a target value of the steering reaction force. The steering-side motor control signal calculation unit 63 calculates the steering-side motor control signal Ms.

The steering angle calculation unit 61 receives the rotation angle θs of the steering-side motor 13. The steering angle calculation unit 61 converts the rotation angle θs into an absolute angle including the range of over 360° by counting the number of rotations of the steering-side motor 13 from, for example, a steering neutral position. The steering angle calculation unit 61 then calculates the steering angle θh by multiplying the rotation angle thus converted into the absolute angle by a conversion coefficient that is based on the rotation speed ratio of the steering-side speed reducer 14. The steering angle θh thus calculated is output to the steered-side control unit 56.

The target reaction torque calculation unit 62 receives the steering torque Th, the vehicle speed Vb, the vehicle speed state signal Sve, the steering corresponding angle θp, and the q-axis current value Iqt. The target reaction torque calculation unit 62 calculates the target reaction torque Ts* based on these state quantities as described later and outputs the calculated target reaction torque Ts* to the steering-side motor control signal calculation unit 63.

The steering-side motor control signal calculation unit 63 receives the rotation angle θs and the three-phase current values Ius, Ivs, Iws in addition to the target reaction torque Ts*. The steering-side motor control signal calculation unit 63 of the present embodiment calculates a d-axis target current value Ids* on the d-axis and a q-axis target current value Iqs* on the q-axis in a dq coordinate system, based on the target reaction torque Ts*. The target current values Ids*, Iqs* indicate a target current value on the d-axis and a target current value on the q-axis in the dq coordinate system, respectively. Specifically, the steering-side motor control signal calculation unit 63 calculates the q-axis target current value Iqs* that has a larger absolute value as the absolute value of the target reaction torque Ts* increases. In the present embodiment, the d-axis target current value Ids* on the d-axis is basically set to zero. The steering-side motor control signal calculation unit 63 then generates the steering-side motor control signal Ms by performing a current feedback calculation in the dq coordinate system and outputs the generated steering-side motor control signal Ms to the steering-side drive circuit 52. Hereinafter, the term "feedback" is sometimes referred to as "F/B."

Specifically, the steering-side motor control signal calculation unit 63 calculates a d-axis current value Ids and a q-axis current value Iqs, which are actual current values of the steering-side motor 13 in the dq coordinate system, by mapping the three-phase current values Ius, Ivs, Iws to the dq coordinates based on the rotation angle θs. The steering-side motor control signal calculation unit 63 then calculates a target voltage value based on the current deviations on the d-axis and the q-axis such that the d-axis current value Ids follows the d-axis target current value Ids* and the q-axis current value Iqs follows the q-axis target current value Iqs*. The steering-side motor control signal calculation unit 63 generates the steering-side motor control signal Ms having a duty cycle that is based on the target voltage value.

The steering-side motor control signal Ms thus calculated is output to the steering-side drive circuit 52. Driving power corresponding to the steering-side motor control signal Ms is thus supplied from the steering-side drive circuit 52 to the steering-side motor 13. The steering-side motor 13 applies the steering reaction force indicated by the target reaction torque Ts* to the steering wheel 3.

Next, the configuration of the steered-side control unit 56 will be described. The steered-side control unit 56 performs each calculation shown in the following control blocks at predetermined calculation intervals to generate the steered-side motor control signal Mt. The steered-side control unit 56 receives the rotation angle θt, the steering angle θh, and the three-phase current values Iut, Ivt, Iwt of the steered-side motor 32. The steered-side control unit 56 generates the steered-side motor control signal Mt based on these state quantities and outputs the generated steered-side motor control signal Mt.

Specifically, the steered-side control unit 56 includes a steered corresponding angle calculation unit 71, a target steered torque calculation unit 72, and a steered-side motor control signal calculation unit 73. The steered corresponding angle calculation unit 71 calculates the steered corresponding angle θp, which is the rotation angle of the pinion shaft 21, based on the rotational angle θt. The target steered torque calculation unit 72 calculates target steered torque Tt*, which is a target value of the steered force. The steered-side motor control signal calculation unit 73 outputs the steered-side motor control signal Mt.

The steered corresponding angle calculation unit 71 receives the rotation angle θt of the steered-side motor 32. The steered corresponding angle calculation unit 71 converts the received rotation angle θt into an absolute angle by counting the number of rotations of the steered-side motor 32 from, for example, a neutral position where the vehicle travels straight. The steered corresponding angle calculation unit 71 calculates the steered corresponding angle θp by multiplying the rotation angle thus converted to the absolute angle by a conversion coefficient that is based on the reduction ratio of the transmission mechanism 33, the lead of the conversion mechanism 34, and the rotation speed ratio of the rack-and-pinion mechanism 24. That is, the steered corresponding angle θp corresponds to the steering angle θh of the steering wheel 3 on the assumption that the pinion shaft 21 is coupled to the steering shaft 11. The steered corresponding angle θp thus calculated is output to the target reaction torque calculation unit 62 and the target steered torque calculation unit 72.

The target steered torque calculation unit 72 receives the steering angle θh and the steered corresponding angle θp. The target steered torque calculation unit 72 includes a target steered corresponding angle calculation unit 74 and a steered angle F/B control unit 75. The target steered corresponding angle calculation unit 74 calculates a target steered corresponding angle θp* that is a target value of the steered corresponding angle θp. The steered angle F/B control unit 75 calculates the target steered torque Tt* by performing such an angle F/B calculation that the steered corresponding angle θp follows the target steered corresponding angle θp*.

Specifically, the target steered corresponding angle calculation unit 74 receives the steering angle θh. The target steered corresponding angle calculation unit 74 calculates the target steered corresponding angle θp* based on the steering angle θh. For example, the target steered corresponding angle calculation unit 74 calculates the target steered corresponding angle θp* as the same angle as the steering angle θh. That is, in the steering control device of the present embodiment, the steering angle ratio, which is the ratio between the steering angle θh and the steered corresponding angle θp, is the constant ratio of 1:1. A subtractor 76 subtracts the steered corresponding angle θp from the target steered corresponding angle θp* to obtain an angle deviation Δθp. The steered angle F/B control unit 75 receives the angle deviation Δθp. The target steered torque calculation unit 72 calculates, as the target steered torque Tt*, the sum of the output values of a proportional element, an integral element, and a differential element that receive the angle deviation Δθp. The target steered torque Tt* thus calculated is output to the steered-side motor control signal calculation unit 73.

The steered-side motor control signal calculation unit 73 receives the rotation angle θt and the three-phase current values Iut, Ivt, Iwt in addition to the target steered torque Tt*. The steered-side motor control signal calculation unit 73 calculates the d-axis target current value Ids* on the d-axis and the q-axis target current value Iqt* on the q-axis in the dq coordinate system, based on the target steered torque Tt*. Specifically, the steered-side motor control signal calculation unit 73 calculates the q-axis target current value Iqt* that has a larger absolute value as the absolute value of the target steered torque Tt* increases. In the present embodiment, the d-axis target current value Idt* on the d-axis is basically set to zero. Like the steering-side motor control signal calculation unit 63, the steered-side motor control signal calculation unit 73 generates the steered-side motor control signal Mt by performing a current F/B calculation in the dq coordinate system, and outputs the generated steered-side motor control signal Mt to the steered-side drive circuit 57. The q-axis current value Iqt calculated in the process of generating the steered-side motor control signal Mt is output to the target reaction torque calculation unit 62.

The steered-side motor control signal Mt thus calculated is output to the steered-side drive circuit 57. Driving power corresponding to the steered-side motor control signal Mt is thus supplied from the steered-side drive circuit 57 to the steered-side motor 32. The steered-side motor 32 applies the steered force indicated by the target steered torque Tt* to the steered wheels 5.

Figure 3:
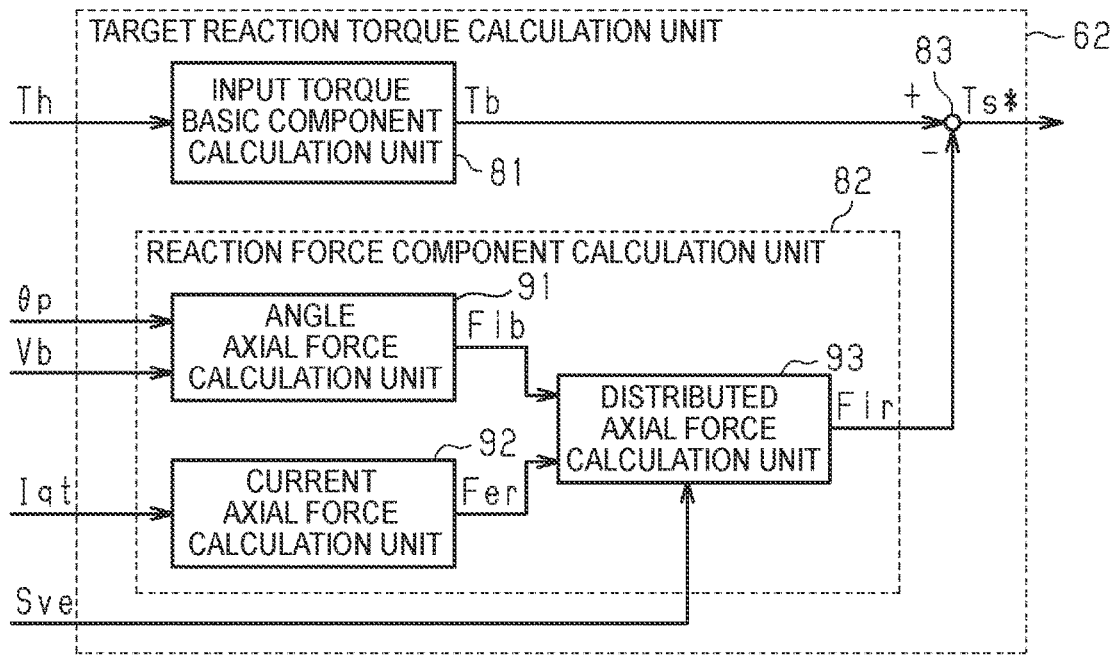
FIG. 3 is a block diagram of a target reaction torque calculation unit of the first embodiment.

Next, the target reaction torque calculation unit 62 will be described. As shown in FIG. 3, the target reaction torque calculation unit 62 includes an input torque basic component calculation unit 81 and a reaction force component calculation unit 82. The input torque basic component calculation unit 81 calculates an input torque basic component Tb that is a force for rotating the steering wheel 3 in the direction of steering by the driver. The reaction force component calculation unit 82 calculates a reaction force component Fir that is a force against rotation of the steering wheel 3 by steering by the driver, namely an axial force applied from the steered wheels 5 to the rack shaft 22.

Specifically, the input torque basic component calculation unit 81 receives the steering torque Th. The input torque basic component calculation unit 81 calculates the input torque basic component Tb that has a larger absolute value as the absolute value of the steering torque Th increases. The input torque basic component Tb thus calculated is output from the input torque basic component calculation unit 81 and input to a subtractor 83.

The reaction force component calculation unit 82 receives the vehicle speed Vb, the vehicle speed state signal Sve, the q-axis current value Iqt for the steered-side motor 32, and the steered corresponding angle θp. Based on these state quantities, the reaction force component calculation unit 82 calculates the reaction force component Fir according to the axial force acting on the rack shaft 22, as described later. The reaction force component Fir corresponds to a calculated axial force obtained by estimating the axial force acting on the rack shaft 22. The reaction force component Fir thus calculated is output to the subtractor 83.

The subtractor 83 subtracts the reaction force component Fir from the input torque basic component Tb, and the target reaction torque calculation unit 62 outputs the subtraction result as the target reaction torque Ts*. The target reaction torque Ts* thus calculated is output to the steering-side motor control signal calculation unit 63. That is, the target reaction torque calculation unit 62 calculates the target reaction torque Ts* based on the reaction force component Fir that that is a calculated axial force. Accordingly, the steering reaction force applied by the steering-side motor 13 is basically a force against steering by the driver, but depending on the deviation between the calculated axial force and the actual axial force acting on the rack shaft 22, may become a force assisting steering by the driver.

Next, the reaction force component calculation unit 82 will be described. The reaction force component calculation unit 82 includes an angle axial force calculation unit 91 that calculates an angle axial force Fib, and a current axial force calculation unit 92 that calculates a current axial force Fer. The angle axial force Fib and the current axial force Fer are calculated by the dimension of torque (N·m). The reaction force component calculation unit 82 further includes a distributed axial force calculation unit 93. The distributed axial force calculation unit 93 calculates, as the reaction force component Fir, a distributed axial force by adding the angle axial force Fib and the current axial force Fer at individually set distribution ratios such that an axial force applied from the road surface to the steered wheels 5, namely road surface information transmitted from the road surface, is reflected.

Specifically, the angle axial force calculation unit 91 receives the steered corresponding angle θp and the vehicle speed Vb. The angle axial force calculation unit 91 calculates the axial force acting on the steered wheels 5, that is, the force transmitted to the steered wheels 5, based on the steered corresponding angle θp and the vehicle speed Vb. The angle axial force Fib is an ideal value of the axial force in a model that is set as desired, and is an axial force that does not include road surface information such as minute unevenness that does not affect the lateral behavior of the vehicle and steps that affect the lateral behavior of the vehicle. Specifically, the angle axial force calculation unit 91 calculates the angle axial force Fib such that the absolute value of the angle axial force Fib increases as the absolute value of the steered corresponding angle θp increases. The angle axial force calculation unit 91 also calculates the angle axial force Fib such that the absolute value of the angle axial force Fib increases as the absolute value of the vehicle speed Vb increases. Accordingly, in the present embodiment, the angle axial force Fib corresponds to the vehicle speed basic axial force that is calculated based on the vehicle speed Vb, and the angle axial force calculation unit 91 corresponds to the vehicle speed basic axial force calculation unit. The angle axial force Fib thus calculated is output to the distributed axial force calculation unit 93.

The current axial force calculation unit 92 receives the q-axis current value Iqt for the steered-side motor 32. The current axial force calculation unit 92 calculates the axial force acting on the steered wheels 5, based on the q-axis current value Iqt. The current axial force Fer is an estimated value of the axial force acting on the steered wheels 5 and is one of road surface axial forces including the road surface information. Specifically, the current axial force calculation unit 92 calculates the current axial force Fer such that the absolute value of the current axial force Fer increases as the absolute value of the q-axis current value Iqt increases, on the assumption that the torque applied to the rack shaft 22 by the steered-side motor 32 is balanced with the torque according to the force applied from the road surface to the steered wheels 5. Accordingly, in the present embodiment, the current axial force Fer corresponds to another state quantity basic axial force calculated based on a state quantity other than the vehicle speed Vb, and the current axial force calculation unit 92 corresponds to another state quantity basic axial force calculation unit. The current axial force Fer thus calculated is output to the distributed axial force calculation unit 93.

The distributed axial force calculation unit 93 receives the vehicle speed state signal Sve in addition to the angle axial force Fib and the current axial force Fer. In the distributed axial force calculation unit 93, an angle distribution gain Gib indicating the distribution ratio of the angle axial force Fib and a current distribution gain Ger indicating the distribution ratio of the current axial force Fer are set in advance based on the experimental results etc. The distributed axial force calculation unit 93 calculates the reaction force component Fir, which is the distributed axial force, by adding the angle axial force Fib multiplied by the angle distribution gain Gib and the current axial force Fer multiplied by the current distribution gain Ger.

The distributed axial force calculation unit 93 of the present embodiment changes the angle distribution gain Gib to a different value according to the determination result indicated by the vehicle speed state signal Sve. Specifically, the distributed axial force calculation unit 93 sets the angle distribution gain Gib to zero when the vehicle speed state signal Sve indicates that the vehicle speed Vb is abnormal. Accordingly, when the obtained vehicle speed Vb is abnormal, the contribution ratio of the angle axial force Fib to the reaction force component Fir is suitably reduced, and the contribution ratio of the current axial force Fer to the reaction force component Fir is relatively increased.

Next, functions and effects of the present embodiment will be described.

(1) The distributed axial force calculation unit 93 sets the angle distribution gain Gib, which indicates the distribution ratio of the angle axial force Fib, to zero when the vehicle speed state signal Sve indicates that the vehicle speed Vb is abnormal. Accordingly, when the vehicle speed Vb is abnormal, the influence of the angle axial force Fib on the reaction force component Fir that is the distributed axial force, namely the contribution ratio of the angle axial force Fib to the reaction force component Fir, is suitably reduced. This configuration thus suitably reduces deviation of the distributed axial force from the actual axial force when the vehicle speed Vb is abnormal.

Second Embodiment

Next, a second embodiment of the steering control device will be described with reference to the drawings. For convenience of description, the same configurations as those of the first embodiment are denoted by the same reference signs as those of the first embodiment, and description thereof will be omitted.

Figure 4:
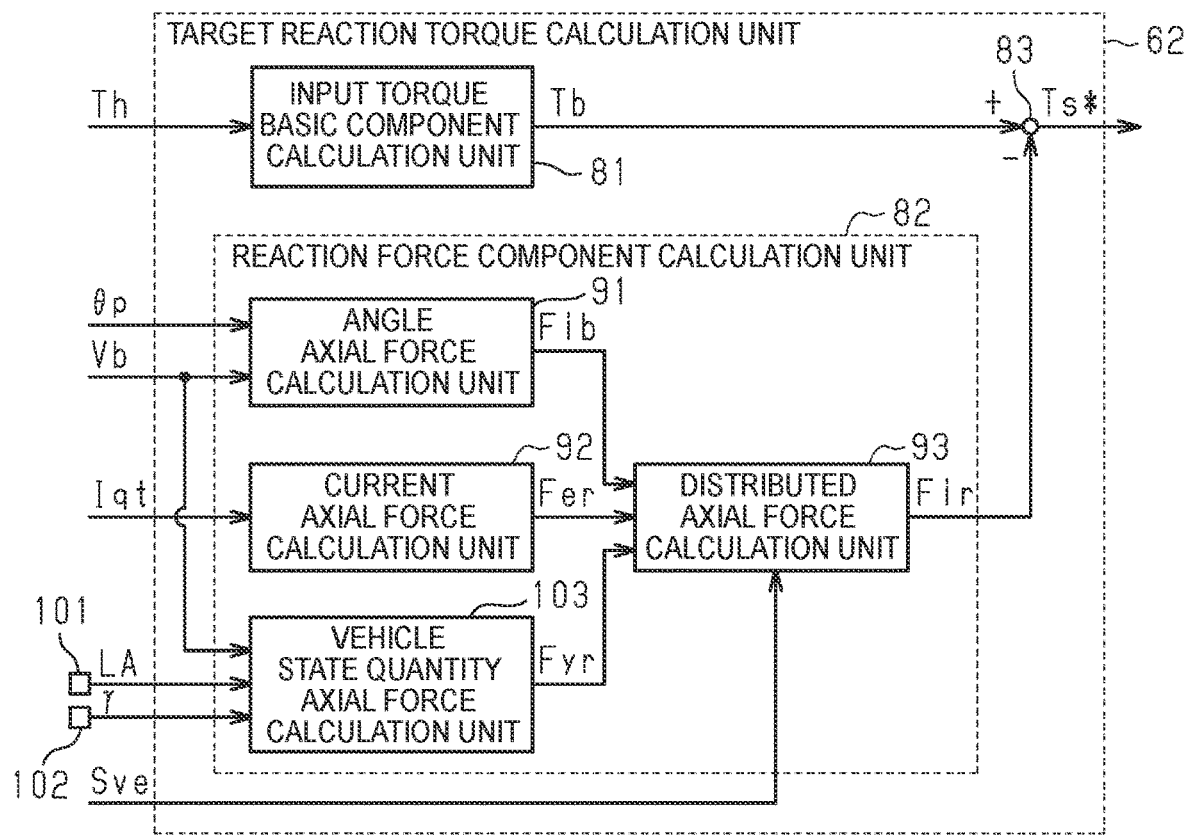
FIG. 4 is a block diagram of a target reaction torque calculation unit of a second embodiment.
Figure 5A:
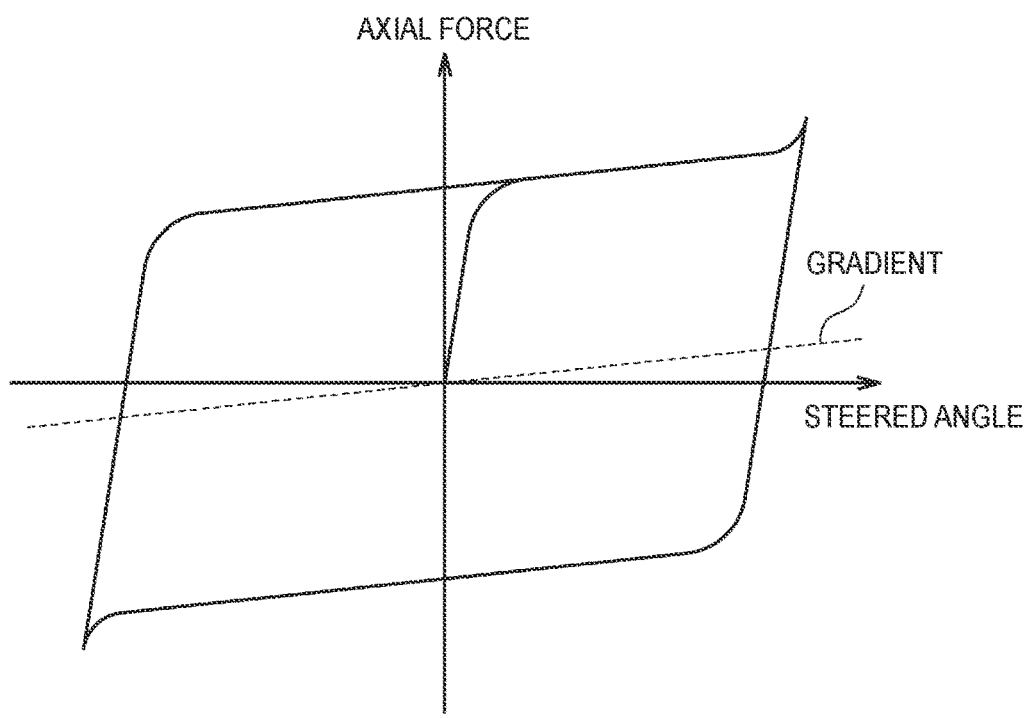
FIG. 5A is a graph showing the relationship between the axial force and the steered angle at a vehicle speed indicating that a vehicle is stopped.
Figure 5B:
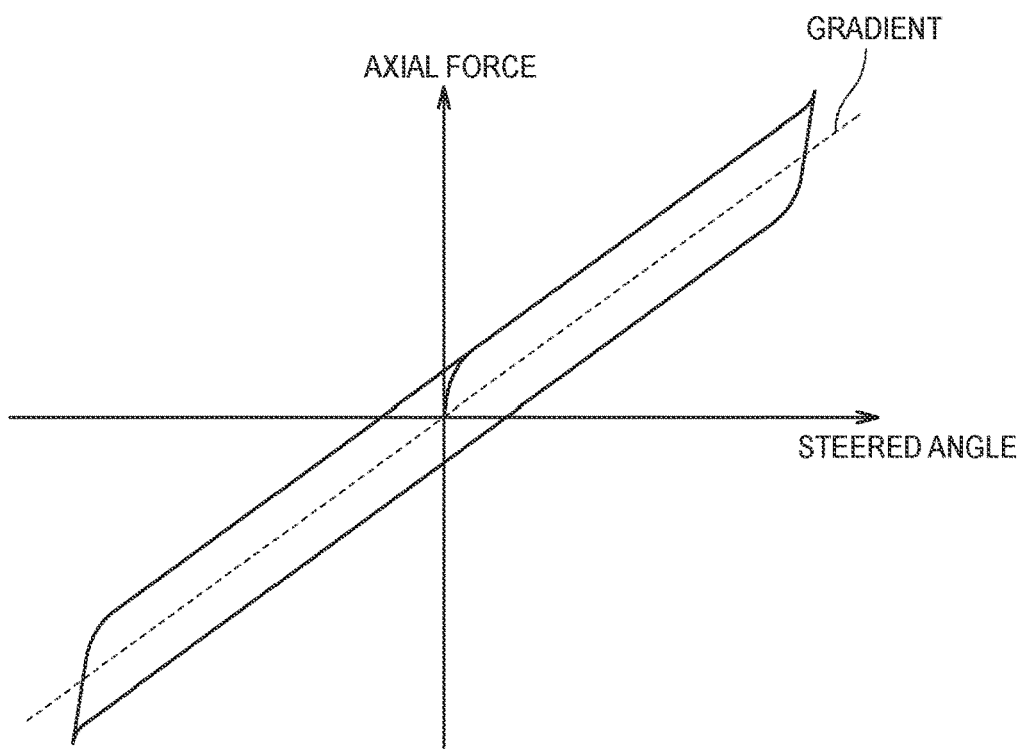
FIG. 5B is a graph showing the relationship between the axial force and the steered angle at vehicle speeds indicating that the vehicle is traveling at medium to high vehicle speeds.

As shown in FIG. 4, the reaction force component calculation unit 82 of the present embodiment receives lateral acceleration LA detected by a lateral acceleration sensor 101 and a yaw rate $\gamma$ detected by a yaw rate sensor 102, in addition to the vehicle speed Vb, the vehicle speed state signal Sve, the q-axis current value Iqt for the steered-side motor 32, and the steered corresponding angle θp. The reaction force component calculation unit 82 further includes a vehicle state quantity axial force calculation unit 103 that calculates a vehicle state quantity axial force Fyr. The vehicle state quantity axial force Fyr is calculated by the dimension of torque (N·m).

The vehicle state quantity axial force calculation unit 103 receives the vehicle speed Vb, the yaw rate $\gamma$, and the lateral acceleration LA. The vehicle state quantity axial force calculation unit 103 calculates, as the vehicle state quantity axial force Fyr, a lateral force Fy by substituting the values of the yaw rate $\gamma$ and the lateral acceleration LA for $\gamma$ and LA in the following equation (1). The vehicle state quantity axial force Fyr is an estimated value obtained by approximately regarding the axial force acting on the steered wheels 5 as the lateral force Fy acting on the steered wheels 5. The vehicle state quantity axial force Fyr is an axial force not including road surface information that does not cause a change in lateral behavior of the vehicle but including road surface information that is transmittable through a change in lateral behavior of the vehicle.

$$Fy = Kla \times LA + K\gamma \times \gamma' \tag{1}$$

In the expression (1), "$\gamma'$" represents a differential value of the yaw rate $\gamma$, "Kla" and "K$\gamma$" represent coefficients set in advance by tests etc. and are variable according to the vehicle speed Vb. Accordingly, in the present embodiment, the vehicle state quantity axial force Fyr corresponds to the vehicle speed basic axial force calculated based on the vehicle speed Vb, and the vehicle state quantity axial force calculation unit 103 corresponds to the vehicle speed basic axial force calculation unit.

The distributed axial force calculation unit 93 of the present embodiment receives the vehicle state quantity axial force Fyr in addition to the angle axial force Fib, the current axial force Fer, and the vehicle speed state signal Sve. In the distributed axial force calculation unit 93, a vehicle state quantity distribution gain Gyr indicating the distribution ratio of the vehicle state quantity axial force Fyr is set in advance in addition to the angle distribution gain Gib and the current distribution gain Ger, based on the experimental results etc. The distributed axial force calculation unit 93 calculates the reaction force component Fir, which is the distributed axial force, by adding the angle axial force Fib multiplied by the angle distribution gain Gib, the current axial force Fer multiplied by the current distribution gain Ger, and the vehicle state quantity axial force Fyr multiplied by the vehicle state quantity distribution gain Gyr.

Like the angle distribution gain Gib, the distributed axial force calculation unit 93 changes the vehicle state quantity distribution gain Gyr to a different value according to the determination result indicated by the vehicle speed state signal Sve. Specifically, the distributed axial force calculation unit 93 sets the vehicle state quantity distribution gain Gyr to zero when the vehicle speed state signal Sve indicates that the vehicle speed Vb is abnormal. Accordingly, when the obtained vehicle speed Vb is abnormal, the contribution ratios of the angle axial force Fib and the vehicle state quantity axial force Fyr to the reaction force component Fir is suitably reduced, and the contribution ratio of the current axial force Fer to the reaction force component Fir is relatively increased.

As described above, the present embodiment has functions and effects similar to those described in (1) of the first embodiment. The above embodiments can be modified as follows. The above embodiments and the following modifications can be combined unless technical inconsistency arises.

In the above embodiments, the average value of the wheel speeds Vfr, Vfl, Vrr, Vrl is used as the vehicle speed Vb. However, the disclosure is not limited to this. For example, the average of the second and third highest wheel speeds of the wheel speeds Vfr, Vfl, Vrr, Vrl may be used, and the method for calculating the vehicle speed Vb may be changed as appropriate. The wheel speeds may not be used, and for example, a value obtained by integrating the longitudinal acceleration of the vehicle may be used as the vehicle speed Vb. Alternatively, a positioning signal from a Global Positioning System (GPS) artificial satellite may be received, and a vehicle speed estimated from a change in position of the vehicle per time based on the received positioning signal may be used as the vehicle speed Vb.

In the above embodiments, the steering control device 1 may calculate the vehicle speed Vb based on the wheel speeds Vfr, Vfl, Vrr, Vrl etc. In the above embodiments, the input torque basic component calculation unit 81 may calculate the input torque basic component Tb based on, for example, the steering torque Th and the vehicle speed Vb. In this case, for example, the input torque basic component calculation unit 81 calculates the input torque basic component Tb that has a larger absolute value as the vehicle speed Vb decreases. It is preferable that when the input torque basic component calculation unit 81 receives the vehicle speed state signal Sve indicating that the vehicle speed Vb is abnormal, the input torque basic component calculation unit 81 consider that the vehicle speed Vb is a predetermined speed that is set in advance and calculate the input torque basic component Tb according to the steering torque Th. For example, the predetermined speed is set to such a speed that the input torque basic component Tb does not become excessively large or excessively small due to a change in steering torque Th.

In the above embodiments, when the vehicle speed Vb is abnormal, the angle distribution gain Gib is set to zero. However, the disclosure is not limited to this. When the vehicle speed Vb is abnormal, the angle distribution gain Gib may be set to a value larger than zero as long as this angle distribution gain Gib is smaller than when the vehicle speed Vb is normal. This configuration also reduces the influence of the angle axial force Fib on the reaction force component Fir that is the distributed axial force, and restrains the steering torque Th required to steer the steering wheel 3 from becoming abnormally large. Similarly, in the second embodiment, when the vehicle speed Vb is abnormal, the vehicle state quantity distribution gain Gyr may be set to a value larger than zero as long as this vehicle state quantity distribution gain Gyr is smaller than when the vehicle speed Vb is normal.

In the above embodiments, the distributed axial force, which is the reaction force component Fir, is calculated by distributing the angle axial force Fib. However, the disclosure is not limited to this. For example, the distributed axial force may be calculated by adding the vehicle state quantity axial force Fyr and the current axial force Fer at individually set distribution ratios.

In the above embodiments, the distributed axial force, which is the reaction force component Fir, is calculated by distributing the current axial force Fer that is a road surface axial force. However, any other road surface axial force may be distributed. Examples of such other road surface axial force include an axial force based on the detection value of an axial force sensor that detects an axial force acting on the rack shaft 22 and an axial force based on tire forces detected by the hub units 46. In the configuration in which a plurality of road surface axial forces are added at individually set distribution ratios, the value of a distribution gain indicating the distribution ratio of a specific one of the road surface axial forces may be increased when the vehicle speed Vb is abnormal as compared to when the vehicle speed Vb is normal.

In the above embodiments, the reaction force component calculation unit 82 may calculate the sum of the distributed axial force and other reaction force as the reaction force component Fir. For example, such other reaction force may be an end reaction force, which is a reaction force against further turning the steering wheel 3 when the absolute value of the steering angle of the steering wheel 3 approaches a steering angle threshold. For example, the steering angle threshold may be the steered corresponding angle θp at an imaginary rack end position that is set closer to a neutral position than a mechanical rack end position where axial movement of the rack shaft 22 is restricted due to the rack end 25 contacting the rack housing 23.

In the above embodiments, the current axial force Fer is calculated based on the q-axis current value Iqt. However, the disclosure is not limited to this. For example, the current axial force Fer may be calculated based on the q-axis target current value Iqt*. In the above embodiments, the angle axial force Fib is calculated based on the steered corresponding angle θp. However, the disclosure is not limited to this. For example, the angle axial force Fib may be calculated based on the target steered corresponding angle θp* or the steering angle θh or may be calculated by other methods such as adding other parameter such as the steering torque Th.

In the above embodiments, the steering system 2 to be controlled by the steering control device 1 has a linkless structure in which power transmission to and from the steering unit 4 is separated from power transmission to and from the steered unit 6. However, the disclosure is not limited to this, and the steering control device 1 may control a steering system having a structure in which power transmission to and from the steering unit 4 can be separated from power transmission to and from the steered unit 6 by a clutch.

In the above embodiments, the steering control device 1 controls the steer-by-wire steering system 2. However, the disclosure is not limited to this. The steering control device 1 may control an electric power steering system that has a steering mechanism for steering the steered wheels 5 based on operation of the steering wheel 3 and that applies motor torque as an assist force for assisting a steering operation. In such a steering system, the steering torque Th required to steer the steering wheel 3 is changed by the motor torque applied as the assist force. In this case, the steering control device calculates target assist torque, which is a target value of the assist force, based on the distributed axial force obtained by adding the vehicle speed basic axial force and the other state quantity basic axial force at individually set distribution ratios.

A technical idea that can be obtained from the above embodiments and modifications will be described. The steering control device, wherein the road surface axial force is a current axial force calculated based on a value associated with a driving current supplied to the motor that applies the motor torque as a steered force that is a force for steering the steered wheels.

What is claimed is:

1. A steering control device for a steering system that changes steering torque required to steer a steering wheel according to motor torque that is applied by an actuator using a motor as a driving source of the actuator, the steering control device comprising
an electronic control unit configured to:
calculate target torque that is a target value of a motor torque;
control operation of a motor such that the motor torque is generated according to the target torque;
calculate a vehicle speed basic axial force based on a detected vehicle speed;
calculate another state quantity basic axial force based on a state quantity other than the detected vehicle speed;
calculate a distributed axial force by adding the vehicle speed basic axial force and the other state quantity basic axial force at individually set distribution ratios;
calculate the target torque based on the distributed axial force; and
reduce a distribution ratio of the vehicle speed basic axial force when the detected vehicle speed is abnormal as compared to when the detected vehicle speed is normal.

2. The steering control device according to claim 1, wherein the electronic control unit is configured to set the distribution ratio of the vehicle speed basic axial force to zero when the detected vehicle speed is abnormal.

3. The steering control device according to claim 1, wherein:
the vehicle speed basic axial force is at least one of an angle axial force that does not include road surface information and a vehicle state quantity axial force including information that is transmittable through a change in lateral behavior of a vehicle out of the road surface information; and
the other state quantity basic axial force is a road surface axial force including the road surface information.

4. The steering control device according to claim 1, wherein:
the steering system has a structure in which power transmission to and from a steering unit is separated from power transmission to and from a steered unit that steers a steered wheel according to steering that is input to the steering unit;
the motor is a steering-side motor that applies the motor torque as a steering reaction force that is a force against the steering that is input to the steering unit; and
the electronic control unit is configured to calculate, as the target torque, target reaction torque that is a target value of the steering reaction force.

5. A method for controlling a steering system that changes steering torque required to steer a steering wheel according to motor torque that is applied by an actuator using a motor as a driving source of the actuator, the method comprising:
calculating, by an electronic control unit, target torque that is a target value of a motor torque;
controlling, by the electronic control unit, operation of a motor such that the motor torque is generated according to the target torque;
calculating, by the electronic control unit, a vehicle speed basic axial force based on a detected vehicle speed;
calculating, by the electronic control unit, another state quantity basic axial force based on a state quantity other than the detected vehicle speed;
calculating, by the electronic control unit, a distributed axial force by adding the vehicle speed basic axial force and the other state quantity basic axial force at individually set distribution ratios;
calculating, by the electronic control unit, the target torque based on the distributed axial force; and
reducing, by the electronic control unit, a distribution ratio of the vehicle speed basic axial force when the detected vehicle speed is abnormal as compared to when the detected vehicle speed is normal.

* * * * *